Figure 1:
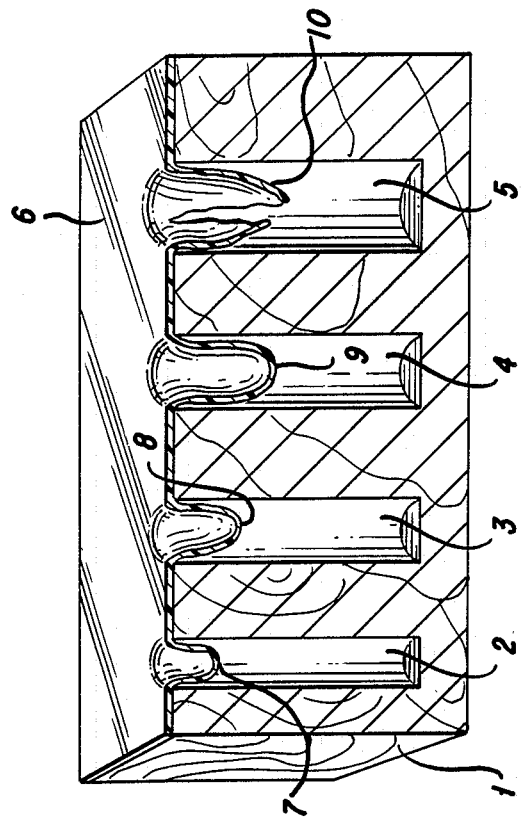

United States Patent [19]

Botto et al.

[11] Patent Number: 4,963,427
[45] Date of Patent: Oct. 16, 1990

[54] MULTILAYER PACKAGING FILM

[75] Inventors: Paolo Botto; Claudio Freschi, both of Milan, Italy

[73] Assignee: W. R. Grace & Co.-Conn., Duncan, S.C.

[21] Appl. No.: 376,979

[22] Filed: Jul. 7, 1989

Related U.S. Application Data

[63] Continuation of Ser. No. 34,514, Apr. 6, 1987, abandoned.

[30] Foreign Application Priority Data

Apr. 15, 1986 [EP] European Pat. Off. ......... 861051993

[51] Int. Cl.⁵ .................. B32B 27/08; B32B 27/26; B32B 27/30; B65D 65/40
[52] U.S. Cl. .................................... 428/215; 428/516; 428/520; 428/910; 428/349; 264/176.1; 426/127
[58] Field of Search ............... 428/215, 520, 516, 349, 428/910

[56] References Cited

U.S. PATENT DOCUMENTS

| | | | |
|---|---|---|---|
| 3,741,253 | 6/1973 | Brax et al. | 138/137 |
| 4,469,742 | 9/1984 | Oberle et al. | 428/520 X |
| 4,501,780 | 2/1985 | Walters et al. | 428/35 |

FOREIGN PATENT DOCUMENTS

| | | |
|---|---|---|
| 0027775 | 5/1984 | Australia . |
| 0070469 | 9/1987 | Australia . |
| 0070470 | 9/1987 | Australia . |
| 0037682 | 10/1987 | Australia . |
| 0034995 | 4/1988 | Australia . |
| 8803475-A | 9/1988 | PCT Int'l Appl. . |
| 1307054 | 2/1973 | United Kingdom . |
| 1404417 | 8/1975 | United Kingdom . |
| 1510115 | 5/1978 | United Kingdom . |
| 1522397 | 8/1978 | United Kingdom . |
| 2040804A | 9/1980 | United Kingdom . |
| 1600250 | 10/1981 | United Kingdom . |
| 2134446A | 8/1984 | United Kingdom . |

Primary Examiner—P. C. Sluby
Attorney, Agent, or Firm—John J. Toney; William D. Lee, Jr.; Mark B. Quatt

[57] ABSTRACT

This invention relates to a co-extruded multilayer film and particularly for vacuum packaging food products. The film comprises at least one layer formed by ethylene-vinyl acetate-copolymer with a vinyl acetate content preferably comprised between 9% and 26% range by weight. The film is preferably radiated at a lower level than 20 MRad. The film is adaped to resist high stretch ratios during the packaging process, so that packaging of bodies with projecting portions or cavities is possible, without breaking the film.

4 Claims, 1 Drawing Sheet

U.S. Patent        Oct. 16, 1990        4,963,427

MULTILAYER PACKAGING FILM

This application is a continuation of application Ser. No. 034,514 filed on Apr. 6, 1987, now abandoned.

This invention relates to a multilayer packaging film for generic use and in particular for vacuum packaging food products.

A method of vacuum packaging food products, exemplary of the inventive film application, is the one disclosed in Italian Patent No. 937,557, corresponding to UK Patent No. 1,307,054, or the one disclosed in Italian Patent No. 1,001,879, corresponding to UK Patent No. 1,404,417.

Known are multilayer films for packaging food products, in particular from U.S. Pat. No. 3,741,253, granted on Jun. 26, 1973, which discloses a film comprising a first layer of a radiated ethylene vinyl acetate copolymer, bonded to an intermediate layer of vinylidene chloride, and a third layer bonded directly to the intermediate layer and formed from a copolymer of ethylene vinyl acetate.

That film cannot, however, be radiated because the intermediate layer of vinylidene chloride tends to release gas while being radiated, and the layer comprised of the ethylene vinyl acetate polymer must be radiated separately from the other layers.

The film is suitable for use in making bags typically utilized to receive food products thereinto, thereafter a vacuum is formed within the bag and clip applied to close it, the filled bag being then immersed in a hot water bath at a temperature approximating the temperature at which the film was stretched.

One of the problems encountered is the unreliable closure provided by the clip, particularly as the film shrinks around the food product under the heat applied, and the clip tends to be pulled away.

U.S. Pat. No. 4,469,742 discloses a multilayer film, (inner) A/B/C/D/C/E (outer), where A is bonding layer comprising an ethylene-propylene copolymer; B is a shrinking layer which may be formed from an ethylene vinyl acetate copolymer having a vinyl acetate content in the range of 6% to 12% by weight, preferably of 6%; C are adhesive layers effective to join the barrier layer D to the remainder of the film. The layer D is formed from a copolymer of ethylene vinyl acetate hydrate (EVOH). The outer layer E isolates the barrier layer against contact with outside moisture and comprises an ethylene vinyl acetate copolymer having a vinyl acetate content ranging form 5% to 12%, preferably of 6%, by weight.

It has been ascertained in actual practice that in the course of the vacuum packaging process, conventional films tend to be broken when subjected to high stretch ratios at particular projections or recesses randomly arranged on the material being packaged.

Accordingly, an object of this invention is to provide a suitable film for vacuum packaging food products, which exhibits high mechanical strength properties even at high stretch ratios, thereby it can conform to the shape of the product being packaged by deformation without breaking.

Another object of the invention is to provide a multilayer film suitable for combined coextrusion and radiation.

A further object of the invention is to provide a film which comprises, where required, an oxygen barrier for preservation of food products liable to oxidation.

These and other objects are achieved by a film according to the invention, which is characterized in that it comprises at least two co-extruded layers of which:

a bonding layer comprising a material selected from olefinic homo- and copolymers and ionomeric materials, and a complementary layer comprising a copolymer of ethylene-vinyl acetate wherein the vinyl acetate content is in the range of 9% to 26% by weight, the remainder being ethylene; said film being cross-linked by radiation.

The vinyl acetate contents is preferably in the range of 12% to 26% and more preferably in the 14% to 18% range, by weight.

The bonding layer comprises a material selected from low-density polyethylene, high-density polyethylene, low-density linear polyethylene, ethylene-vinyl acetate copolymer with a vinyl acetate content in the 3% to 9% range by weight, ionomeric resins, and mixtures thereof.

Of preference, that bonding layer is selected from low-density polyethylene, high-density polyethylene, and a mixture thereof.

More preferably, the bonding layer is formed essentially from low-density polyethylene.

In a first embodiment, the film comprises two co-extruded layers only: a bonding layer and a complementary layer, and is intended for use in packaging food products which require no oxygen barrier.

In a variation of this first embodiment, the film comprises an outer layer which is co-extruded along with the bonding layer and the complementary layer, the outer layer being located outwardly on the remote side from the bonding layer. The outer layer is useful as a protection against wear, and comprises a material selected from low-density polyethylene, high-density polyethylene, low-density linear polyethylene, ethylene-vinyl acetate copolymer with a vinyl acetate content of 3% to 9% by weight, ionomeric resin, and mixtures thereof.

Of preference, the outer layer comprises a material selected from: low-density polyethylene, high-density polyethylene, and a material yielded by mixing them together.

More preferably, the outer layer is formed essentially from low-density polyethylene.

In a second embodiment, the film comprises an oxygen barrier layer. That second embodiment is specially suitable for packaging applications with food products which require preservation against the oxidizing action of air oxygen.

In particular, the barrier layer is placed between the complementary layer and outer layer, and is joined to the nearby layers by two adhesive layers. The barrier layer comprises an ethylene-vinyl alcohol copolymer.

This second embodiment envisages preferably a double complementary layer. In this case, the sequence for the co-extruded layers would be, from the inside out: a bonding layer, a complementary layer, and adhesive layer, a barrier layer, and adhesive layer, a complementary layer, an outer layer.

The adhesive layers are formed in general from an ethylene vinyl acetate copolymer suitable for crosslinking by radiation and being chemically modified to accept functional groups having great affinity for the ethylene-vinyl alcohol copolymer that forms the barrier layer. Suitable commercially available adhesives are identified by the trade names of Bynel 3095, Plexar PX3. Both of these commercially available adhesives are ethylene vinyl acetate copolymer-based materials, with the EVA having a vinyl acetate content of about 9% and 8% respectively, modified with an anhydride grafted polyolefin. The Bynel ™ material is available from du Pont; the Plexar ™ material is available from Quantum/USI.

Irrespective of the embodiment of choice, the combined thickness of the stretched layer or layers will be 35% to 75% of the overall thickness of the film and preferably from 50% to 65% of the overall film thickness. The film overall thickness ranges from 50μ to 300μ, preferably from 80 to 200μ, and still better from 120μ to 150μ.

The thickness of the bonding layer and/or thickness of the outer layer amount to 3–25% of the overall thickness of the film.

The bonding layer and/or outer layer are formed from low-density polyethylene and have a thickness dimension amounting to 3–10% of the overall thickness of the film.

The film according to the invention is obtained by a method which allows to improve the formability and abuse resistance of a known multi-layer, coextruded, thermoplastic packaging film, which has layers of ionomer, EVOH, low density polyethylene and high density polyethylene. Such improvement is obtained replacing the low density polyethylene layers with ethylene vinyl acetate copolymer layers having a vinyl acetate content in the range of 12% to 26%.

The entire coextruded multi-layer film is then irradiated with ionizing radiation to induce crosslinking in the ethylene polymers and copolymers.

The radiation level is lower than 20 MRads, preferably is in the 8 to 16 MRad range, still better preferably in the 12 to 14 MRad range.

The invention will be more clearly understood from the Examples and the drawing herewith, given by way of illustration and not of limitation of this invention.

Table 1 shows examples 1–8, wherein examples 1 and 2 are conventional comparative Examples and Examples 3–8 illustrate the inventive film. Abbreviations are standard in the art, as follows.
LDPE=Low-Density Polyethylene:
HDPE=High-Density Polyethylene:
LLDPE=Linear Low-Density Polyethylene; and
EVA=Ethylene Vinyl Acetate Copolymer.

The last column in the Table (Hole Area) relates to the results of a specially meaningful test to an understanding of this invention objectives. The holes whose areas have been set forth therein are shown in FIG. 1, which depicts a wooden block 1, drilled and vacuum packaged. The film 6 completely envelops the block 1, and of course, also covers the ports of the circular holes 2,3,4, and 5. The depth dimension is the same for all the holes but the area of each hole port increases progressively.

During the packaging tests with the wooden block 1, the film tends to undergo a stretching stress which is the higher the larger is the area of a hole. In the Example considered in the figure, the film 7,8,9 stretches without breaking over the holes 2,3 and 4, but breaks in 10, over the largest area hole 5. The area of the largest hole before the film becomes broken is entered, therefore, in the last column of Table 1, and is highly representative of the film packaging ability.

The packaging tests on the block 1 were conducted throughout examples 1–8 on a Cryovac VS44 machine equipped with a rotary vacuum pump and a serially connected auxiliary pump. The temperature under the heater bell was of 200° C., and the films were infrared pre-heated up to 70°–80° C. The level of the vacuum provided varied between 3 and 6 millibars.

As can be taken from Table 1, with specific reference to examples 5,6,7 and 8, the inventive film affords breakage-free packaging of holes having a section area which is about seven times as large as those of the comparative films in Examples 1 and 2.

| EXAMPLE | bonding layer/ Thickness in microns | Stretched layer/ Thickness in microns | Adhesive layer/ Thickness in microns | Barrier layer/ Thickness in microns | Adhesive layer/ Thickness in microns | Stretched layer/ Thickness in microns | Outer layer/ Thickness in microns | Overall Thickness (microns) | Radiation (MRad) | Hole area (mm²) |
|---|---|---|---|---|---|---|---|---|---|---|
| 1 Comparison | Ionomer/ 18 | LDPE/ 29 | Modified EVA/ 5 | Ethylene-Vinyl Alcohol Copolymer/ 7 | Modified EVA/ 5 | LDPE/ 29 | HDPE/ 7 | 100 | 12 | 50,3 |
| 2 Comparison | Inomer/ 27 | LDPE/ 47 | Mod. EVA/ 7 | Ethylene-Vinyl Alcohol Copolymer/ 11 | Mod. EVA/ 7 | LDPE/ 40 | HDPE/ 11 | 150 | 12 | 50,3 |
| 3 | Ionomer (surlyn 1702)/ 18 | EVA 9% VA/ 30 | Mod. EVA/ 5 | Ethylene-Vinyl Alcohol Copolymer/ 7 | Mod. EVA/ 5 | EVA 9% VA/ 30 | HDPE/ 7 | 102 | 12 | 153,9 |
| 4 | Ionomer (surlyn/ 18 | EVA 18% VA/ 30 | Mod. EVA/ 5 | Ethylene-Vinyl Alcohol Copolymer/ 7 | Mod. EVA/ 5 | EVA 18% VA/ 30 | HDPE/ 7 | 102 | 12 | 201 |
| 5 | Ionomer (surlyn 1702)/ 7 | EVA 18% VA/ 52 | Mod. EVA/ 5 | Ethylene-Vinyl Alcohol Copolymer/ 9 | Mod. EVA/ 5 | EVA 18% VA/ 26 | HDPE/ 26 | 130 | 12 | 380,1 |
| 6 | LDPE/ 8 | EVA 18% VA/ 59 | Mod. EVA/ 3 | Ethylene-Vinyl Alcohol Copolymer/ | Mod. EVA/ 3 | EVA 18% VA/ 45 | HDPE/ 25 | 150 | 12 | 380,1 |

-continued

| EX-AM-PLE | bonding layer/ Thickness in microns | Stretched layer/ Thickness in microns | Adhesive layer/ Thickness in microns | Barrier layer/ Thickness in microns | Adhesive layer/ Thickness in microns | Stretched layer/ Thickness in microns | Outer layer/ Thickness in microns | Overall Thickness (microns) | Radiation (MRad) | Hole area (mm$^2$) |
|---|---|---|---|---|---|---|---|---|---|---|
| 7 | HDPE/ 25 | EVA 18% VA/ 45 | Mod. EVA/ 3 | Ethylene--Vinyl Alcohol Copolymer/ 7 | Mod. EVA/ 3 | EVA 18% VA/ 59 | Ionomer/ 8 | 150 | 12 | 314,2 |
| 8 | LDPE/ 25 | EVA 18% VA/ 45 | Mod. EVA/ 3 | Ethylene--Vinyl Alcohol Copolymer/ 7 | Mod. EVA/ 3 | EVA 18% VA/ 59 | LDPE/ 8 | 150 | 12 | 380,1 |

What is claimed is:

1. A vacuum packaging film comprising at least three coextruded layers of which:
   (a) a bonding layer comprises a material selected from the group consisting of low density polyethylene, high density polyethylene, ionomer, and mixtures thereof;
   (b) a complementary layer comprises an ethylene vinyl acetate copolymer, wherein the vinyl acetate content is in the 15% to 26% range, by weight, the remainder being ethylene; said film being cross-linked;
   (c) said complementary layer having a thickness of between about 16 microns and 225 microns; and
   (d) an outer layer coextruded with the bonding layer and the complementary layer, said outer layer being provided outwardly on the remote side from said bonding layer, said outer layer comprising a material selected from the group consisting of low density polyethylene, high density polyethylene, linear low density polyethylene, ethylene vinyl acetate copolymer with a vinyl acetate content of 3% to 9% by weight, ionomer, and mixtures thereof.

2. The film according to claim 1 wherein a barrier layer is provided between said complementary and outer layers.

3. The film according to claim 2 wherein said barrier layer is joined to the complementary and outer layers by means of two adhesive layers.

4. A cross-linked vacuum packaging film comprising the following successive coextruded layers:
   (a) a bonding layer comprising a material selected from the group consisting of olefinic homopolymers and copolymers and ionomers;
   (b) a complementary layer comprising an ethylene vinyl acetate copolymer wherein the vinyl acetate content is in the 9% to 26% range, by weight, the remainder being ethylene;
   (c) an adhesive layer;
   (d) an oxygen barrier layer;
   (e) a second adhesive layer;
   (f) a second complementary layer comprising an ethylene vinyl acetate copolymer wherein the vinyl acetate content is in the 9% to 26% range, by weight, the remainder being ethylene;
   (g) an outer layer comprising a material selected from the group consisting of low density polyethylene, high density polyethylene, linear low density polyethylene, ethylene vinyl acetate copolymer with a vinyl acetate content of 3% to 9% by weight, ionomer, and mixtures thereof; and
   (h) the complementary layers together having a combined thickness of between about 16 microns and 225 microns.

* * * * *